(No Model.)

P. J. FOULON.
SELF LUBRICATING HUB.

No. 348,961. Patented Sept. 14, 1886.

Witnesses:
Frank H. Hyatt
G. F. Flack

Inventor:
Peter J. Foulon,
by his Attorney,
Rollin M. Morgan.

UNITED STATES PATENT OFFICE.

PETER J. FOULON, OF NEW YORK, N. Y.

SELF-LUBRICATING HUB.

SPECIFICATION forming part of Letters Patent No. 348,961, dated September 14, 1886.

Application filed October 12, 1885. Serial No. 179,680. (No model.)

*To all whom it may concern:*

Be it known that I, PETER J. FOULON, of the city of New York, in the county and State of New York, have invented a new and useful Self-Lubricating Hub, of which the following is a description sufficient to enable those skilled in the art to make and apply the same, reference being had to the accompanying drawings, wherein similar letters of reference indicate corresponding parts.

Figure 2:
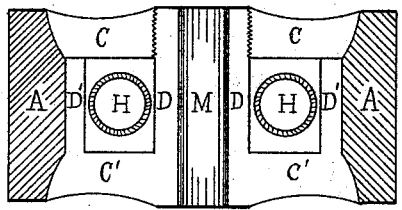
Figure 1:
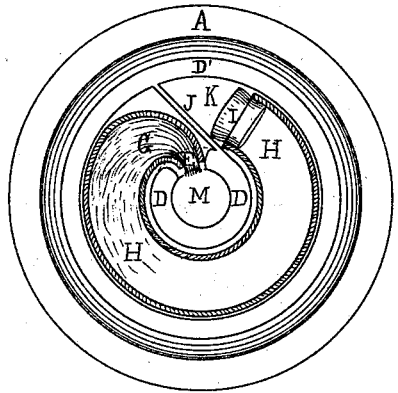

Figure 1 is a sectional side view of my invention applied to the wheel of a roller-skate, and Fig. 2 is a cross-section of the same.

The scope of my invention includes the application of this self-lubricating hub to all kinds of wheels; but the means of application are ordinary and well known.

A is a tire, the inner edges beveled or gouged to fit the casings C and C'. The hub has inner and outer rims, D and D', forming a circular canal divided by the slanting partition J. On one side of this partition is the hole E, communicating with the axle M.

H is an oil-tube made of glass, lead, or other suitable material, and so formed as to fit and lie in the circular channel above described, and provided with the wick G, extending throughout the length of the oil-tube and guided into contact with the axle M by the slanting partition J. I prefer to make this tube of glass with a neck drawn and curved to fit into the hole E, and thereby be held in position; but metal so formed and used has advantages in rough use. The back end may be closed with a cork, I, and the space K between it and the partition J should be filled with some elastic material or spiral spring to press the tube and its wick forward and keep the latter in contact with the axle. The oil-tube is removable, and when filled with oil replaced, whereupon a steady and just sufficient supply of oil reaches the axle for the purposes of complete lubrication. The casings C and C' when coupled in the journal hold the tire and inclose the hub. One of these casings, C', may be made as a part of the hub, and one, C, removable, being held in place in any well-known way, or both may be made removable.

What I claim as new, and desire to secure by Letters Patent, is—

1. A self-lubricating hub having inner and outer rims forming a circular channel divided by a slanting partition and provided with a hole to the axle, holding an oil tube and wick communicating with said axle, all substantially as described, and for the purpose specified.

2. A circular oil tube and wick inclosed in a hub and in contact with the axle, substantially as described, and for the purposes specified.

3. A hollow hub with removable casings inclosing an oil tube and wick, and holding the tire, substantially as described, for the purpose specified.

4. In combination with the hollow hub and contained oil-tube, and as an article of manufacture for use in such combination, an annular tire with its inside edges gouged, as described, to fit and be held by the casings, in the manner and for the purpose substantially as specified.

5. The self-lubricating hollow hub having inner and outer rims, D and D', partition J, hole E, oil-tube H, wick G, inclosed by casings C and C', holding tire A, all in combination, substantially as described, and for the purpose specified.

Dated New York, September 30, 1885.

PETER J. FOULON.

Witnesses:
FRANK H. HYATT,
WM. M. HOES.